United States Patent Office

3,265,617
Patented August 9, 1966

3,265,617
LUBRICANT
Charles M. Allen, Columbus, Ohio, assignor, by mesne assignments, to The Battelle Development Corporation, Columbus, Ohio, a corporation of Delaware
No Drawing. Continuation of application Ser. No. 172,802, Feb. 12, 1962. This application Feb. 5, 1965, Ser. No. 430,735
1 Claim. (Cl. 252—25)

The present application is a continuation of earlier copending application Serial No. 172,802, filed February 12, 1962, now abandoned.

This invention relates to a new lubricant and lubrication method. More particularly, it relates to a lubricant and a method for substantially reducing the coefficient of friction between rubbing, contacting surfaces over a wide temperature range by using as a lubricant a mixture of metal-free phthalocyanine and molybdenum disulfide.

At the present time, there is no lubricant available that will maintain the coefficient of friction between two rubbing, contacting surfaces at a low value over a wide temperature range. For example, there are many lubricants that provide adequate lubrication between contacting surfaces at temperatures below 600° F. When the temperature goes much beyond 600° F., these lubricants break down and galling between the surfaces occurs. On the other hand, lubricants effective at a temperature above 600° F. are generally ineffective at lower temperatures.

Today, however, there are many applications or situations where surfaces are in rubbing contact over temperature ranges of —90° F. to 1500° F., and above. Supersonic space flights usually encounter such conditions. Thus, there is a need in the art for a lubricant and a lubrication method that would prevent excessive wear and galling of rubbing, contacting surfaces over the temperature range of —90° F. to 1500° F.

It is an object of this invention to provide a lubricant that would maintain a low coefficient of friction between rubbing surfaces over a temperature range of from —90° F. to 1500° F.

It is another object of this invention to reduce the coefficient of friction between rubbing, contacting surfaces over the temperature range of from —90° F. to 1500° F. by lubricating with a mixture of metal-free phthalocyanine and molybdenum disulfide.

It has been known in the art for many years that molybdenum disulfide is an effective lubricant at temperatures up to 500–600° F. Above this temperature, oxidation of molybdenum disulfide occurs. Metal-free phthalocyanine is utilized as a lubricant over the temperature range of 70° to 1350° F. Metal-free phthalocyanine is very effective as a lubricant at from 500–600° F. up to 1200–1350° F. At temperatures below 500–600° F. the lubricating ability of metal-free phthalocyanine is diminished.

It has been discovered that when a mixture of metal-free phthalocyanine and molybdenum disulfide is used as a lubricant to reduce the coefficient of friction and wear between contacting surfaces, a lower coefficient of friction results over a wider temperature range than is obtained with either constituent singly. This behavior cannot be anticipated or predicted from the known properties of the individual constitutents of the mixture. The metal-free-phthalocyanine–molybdenum-disulfide mixture was found to have lubricating properties over the temperature range of from 70° F. to 1350° F. superior to either metal-free phthalocyanine or molybdenum disulfide alone at any given temperature over that range. Specifically, using the coefficient of friction as a yardstick, the metal-free-phthalocyanine–molybdenum-disulfide mixture is a substantially better lubricant than (1) molybdenum disulfide alone, at temperatures below 600° F., and (2) metal-free phthalocyanine alone, at temperatures above 600° F. As has been pointed out, this result is entirely unexpected.

This invention comprises a lubricant comprising a mixture of metal-free phthalocyanine and molybdenum disulfide and a method comprising applying such lubricant to surfaces in rubbing, contacting relationship.

The coefficient of friction observed between contacting surfaces is not sensitive to the ratio of the constituents of the metal-free-phthalocyanine and molybdenum-disulfide mixture. A mixture of about 30 percent by weight of metal-free phthalocyanine is satisfactory for use throughout the entire temperature range of from 70° F. to 1350° F. In general, high percentages of metal-free phthalocyanine are desirable at higher temperatures. At temperatures above 600° F., metal-free phthalocyanine should comprise 50 percent or greater by weight of the mixture, and at temperatures below 500–600° F., less than 50 percent by weight of the mixture. At temperatures above 600° F., when air or oxygen is present, metal-free phthalocyanine should preferably comprise greater than 80 percent by weight of the lubricant mixture. Air or oxygen can be excluded from the lubrication site at these elevated temperatures by use of an artificial atmosphere, such as nitrogen. With a non-oxidizing atmosphere present, more nearly equal weights of phthalocyanine and molybdenum disulfide form an effective lubricant mixture.

There is no critical method for preparing the mixture of metal-free phthalocyanine and molybdenum disulfide. Dry powdered metal-free phthalocyanine and dry powdered molybdenum disulfide are mixed together by conventional means in the desired proportions. After mixing has been accomplished, a portion of the mixture is placed between the rubbing, contacting surfaces, with provision for a reserve supply of the lubricant mixture, so that some of the mixture is always maintained between the rubbing surfaces. Again, conventional techniques for adding solid lubricants may be employed in adding the lubricant mixture of this invention.

The lubricant is effective whether the rubbing, contacting surfaces are made of metal or nonmetals, or mixtures thereof. The lubricant has been found to be particularly effective in lubricating bearing surfaces. Thus, the lubricant described herein is not only highly effective over a wide temperature range but is also effective for a broad spectrum of materials that may be in rubbing contact.

It is again pointed out that the lubricant comprising a mixture of metal-free phthalocyanine and molybdenum disulfide is most effective in lubricating bearings under operating conditions. Since, at the point of rubbing contact, bearings operate at high temperatures and pressures, harsh conditions are imposed on any lubricant used in this application. The high degree of effectiveness of the method and lubricant described herein under such extreme conditions clearly illustrate their great value, as well as their versatility.

The following examples are intended to be illustrative of the manner in which the metal-free-phthalocyanine ($PCH_2$)–molybdenum disulfide ($MoS_2$) mixture is employed as a lubricant in specific applications:

*Example I*

Dry powdered metal-free phthalocyanine and molybdenum disulfide were blended fifty-fifty by volume and thoroughly mixed. This mixture was applied as a lubricant between two disks in rubbing contact with one another, said disks having the following composition.

Material: Percentage by weight
  Nickel _____ 2.5
  Chromium _____ 32.0
  Tungsten _____ 17.0
  Iron _____ 3.0
  Carbon _____ 2.5
  Others _____ 2.5
  Cobalt _____ Balance The coefficient of friction was then measured as the temperature was varied over the range from 130° F. to 1200° F. A nitrogen carrier was used to supply lubricant between the rubbing surfaces. The maximum flow rate of the nitrogen carrier was 1 cubic foot per minute. A load of 40 pounds was applied. A load of 40 pounds corresponds to about 100,000 p.s.i. maximum Hertz stress. The running time at maximum load was 32 minutes, and the total running time was 36 minutes. The average coefficient of friction at maximum load was 0.03 to 0.09. After operation under these conditions, the disks were examined and showed smoothed high spots in roughened high-temperature track and a polished low-temperature track. The disks were contacted at 9400 feet per minute rolling speed, with 4 percent sliding.

Previous operation under these conditions with other lubricants had caused damage to the high-temperature wear track. Included in these other lubricants were metal-free phthalocyanine and molybdenum disulfide as individual lubricants.

*Example II*

Disks of the same composition as those employed in Example I were operated at 12,000 r.p.m., giving a mean surface velocity of about 9400 feet per minute, with 4 percent sliding superimposed. The metal-free-phthalocyanine–molybdenum-disulfide mixture was used as a lubricant, and dry nitrogen was used as a lubricant carrier and a blanket environment at a combined rate of about 2 cubic feet per minute. The load was constant at 40 pounds, which is equivalent to about 100,000 p.s.i. maximum Hertz contact stress, if no wear has occurred. The following data applied to this run:

| Disk temperature, F. | Operating time, minutes | Average lube flow gm./min. | | Average coefficient of friction | Amplitude of variation of friction coefficient | Wear track width, mm. |
|---|---|---|---|---|---|---|
| | | ($MoS_2$) | ($PCH_2$) | | | |
| 1,200 | 207 | (1) | (1) | .05 | .01–.025 | |
| 1,000 | 67 | .14 | .30 | .055 | .01 | |
| 800 | 46 | | | .055 | .01 | |
| 600 | 28 | | | .055 | .015 | |
| 400 | 33 | | | .06 | .018 | |
| Ambient | 56 | | | .07 | .01–.025 | |

1 Average over entire run.

This run was extended over 8 hours and 11 minutes, and the temperature was cycled from ambient to 1200° F. and back four times during this run. Two of these cycles were made at maximum heating and cooling rates. After the run, the disk wear surfaces were covered with thin, very adherent black films. There was little sign of surface damage, except for scattered small pits, and wear was very low.

*Example III*

The conditions of Example II were repeated, utilizing a new set of disks of the same composition as those of Example II, and the following data were obtained:

| Disk temperature, F. | Operating time, minutes | Average lube flow gm./min. | | Average coefficient of friction | Amplitude of variation of friction coefficient | Wear track width, mm. |
|---|---|---|---|---|---|---|
| | | ($MoS_2$) | ($PCH_2$) | | | |
| 1,200 | 15 | .5 | .3 | .055 | .008 | 2.3 |
| Ambient | 5 | .2 | .15 | .065 | Negligible | |
| 400 | 5 | .2 | .15 | .06 | ___do___ | |
| 600 | 5 | .2 | .15 | .065 | ___do___ | |
| 800 | 5 | .2 | .15 | .06 | ___do___ | |
| 1,000 | 5 | .3 | .2 | .055 | ___do___ | |
| 1,200 | 3 | .6 | .3 | .055 | ___do___ | |

After operation, the disk surfaces exhibited a continuous film, with no scoring or pitting. The addition of some metal-free phthalocyanine, to molybdenum disulfide was intended to reduce the rather high friction of molybdenum disulfide, particularly in the 800° F. to 1000° F. temperature range, and to reduce lubricant build-up tendency at elevated temperatures. The combination was unusually effective, giving very low wear, low friction (lower than either constituent alone), and smooth operation throughout the temperature range from room temperature up to 1200° F. Lubricant build-up after high-temperature operation was very low. While there was some build-up during low-temperature operation, brief periods at high temperature were sufficient to drive off the excess lubricant, leaving only thin, smooth films. There was no scoring or pitting.

*Example IV*

The materials and load conditions of Example II were repeated, utilizing an air environment. In this run, dry nitrogen was not used as a lubricant carrier and environment. In this air environment, the following data were obtained:

| Disk temperature, F. | Operating time, minutes | Average lube flow gm./min. | | Average coefficient of friction | Amplitude of variation of friction coefficient | Wear track width, mm. |
|---|---|---|---|---|---|---|
| | | (MoS₂) | (PCH₂) | | | |
| 400 | 2 | .2 | .2 | .065 | .008 | |
| 600 | 2 | .2 | .2 | .065 | .008 | |
| 800 | 2 | .2 | .2 | .06 | .008 | |
| 1,000 | 5 | .2 | .4 | .06 | .008 | |
| 1,200 | 5 | .2 | .6 | .055 | .008-.015 | |

The disk wear surfaces were smooth and were similar in appearance.

*Example V*

Disks of the same composition as those of Example II and contacted under the same conditions were lubricated only with molybdenum disulfide. Under these conditions, the following data were obtained:

| Disk Temperature, F. | Operating time, minutes | Average lube flow, gm./min. | Average coefficient of friction | Amplitude of variation of friction coefficient | Wear track width, mm. |
|---|---|---|---|---|---|
| 1,200 | 15 | .5 | .15 | .04 | 2.7 |
| 1,000 | 5 | .4 | .16 | .03 | |
| 800 | 5 | .4 | .15 | .03 | |
| 600 | 5 | .4 | .13 | .02 | |
| 400 | 5 | .4 | .13 | .02 | |

These data reveal that when molybdenum disulfide alone is used as a lubricant, the average coefficient of friction is poorer by a factor of at least 2 than when the metal-free-phthalocyanine–molybdenum-disulfide mixture is used. In addition, the disk surfaces were covered with myriads of very fine pits.

*Example VI*

The materials and the conditions of Example II were again repeated, using metal-free phthalocyanine alone as a lubricant. The pertinent data were:

| Disk Temperature, F. | Operating time, minutes | Average lube flow, gm./min. | Average coefficient of friction | Amplitude of variation of friction coefficient | Wear track width, mm. |
|---|---|---|---|---|---|
| 1,200 | 15 | .8 | .18 | .04 | 3.6 |
| 900; 1200 | 16 | .7; .9 | .10 | .01 | |
| 1,000 | 5 | .8 | .09 | .01 | |
| 800 | 5 | .6 | .09 | .01 | |
| 600 | 5 | .2 | .08 | .01 | |
| 400 | 5 | .2 | .12 | .06 | |

Based on the average coefficient of friction, metal-free phthalocyanine alone is poorer by a factor of at least 2, and under some conditions by a factor of 3, than a lubricant mixture of metal-free phthalocyanine and molybdenum disulfide.

*Example VII*

If titanium-carbide cermet disks were lubricated in separate experiments with (1) a mixture of metal-free phthalocyanine and molybdenum disulfide, (2) metal-free phthalocyanine alone, and (3) molybdenum disulfide alone, coefficients of friction measured over a wide temperature range would be substantially lower where the mixture of metal-free phthalocyanine and molybdenum disulfide was used as the lubricant.

In some experiments the lubricants were evaluated at 1350° F. Experiments did not go beyond a temperature of 1350° F., because of limitations of the furnace equipment. Since the mixture was effectively serving as a lubricant at 1350° F. and the rate of decomposition of metal-free phthalocyanine above 1350° F., although increasing rapidly does not preclude its use, there is every reason to expect that this lubricant mixture would be effective at significantly higher temperatures. Metal-free phthalocyanine begins to slowly decompose at a temperature of 900° F. The rate of decomposition remains essentially constant until a temperature of about 1150° F. is reached. At temperatures above 1150, the rate is increased but not catastrophically. One of the decomposition products is hydrogen and the hydrogen evolution tends to blanket the lubrication site, thereby excluding oxygen.

Likewise, since the mixture effectively lubricates at room temperature, it is expected that it would serve effectively as a lubricant down to −90° F., and below.

While the examples deal with metal compositions, the metal-free-phthalocyanine–molybdenum-disulfide mixture will also effectively lubricate cermets, ceramics, and plastics. While the examples describe a method of solid-lubricant lubrication by means of a carrier gas, other mechanisms are quite possible. These include bonded solid lubricant films in which bonding agent is any one of a number of organic resins or metal matrices. For aerospace applications, sticks of cold pressed lubricant powders in contact with the surface are anticipated. Also, lubricant transport by evaporation (vapor phase) is considered to be a good possibility in the vacuum of outer space. The vapor pressure of the individual lubricant constituents, molybdenum disulfide and metal-free phthalocyanine, are attractive for such potential applications.

What is claimed is:

A lubricant composition for lubricating contacting metal-containing surfaces in an oxidizing atmosphere wherein said metal-containing surfaces are at a temperature in the range from about 70° F. to about 1350° F. consisting essentially of a mixture of metal-free phthalocyanine and molybdenum disulfide, wherein the concentration of metal-free phthalocyanine is in the range of from about 5 to about 95 percent by weight.

References Cited by the Examiner

"Fundamental Processes in Lubricating Metal Surfaces at 100° F. to 1700° F.," by E. N. Klemgard in Lubricating Engineering, vol. 16, No. 10, October 1960, pages 468–476.

DANIEL E. WYMAN, *Primary Examiner.*

IRVING VAUGHN, *Assistant Examiner.*